United States Patent
Christnacher et al.

(10) Patent No.: US 12,473,432 B2
(45) Date of Patent: Nov. 18, 2025

(54) ISOMERIC MIXTURE OF REACTIVE DYES AND THEIR USE FOR THE DYEING OR PRINTING OF TEXTILE FIBRE MATERIALS

(71) Applicant: Archroma (Switzerland) GmbH, Pratteln (CH)

(72) Inventors: Hubert Christnacher, Dietwiller (FR); Fanny Ehret, Reiningue (FR); Michael Nicollet, Village-Neuf (FR); Jean-Christophe Graciet, Village-Neuf (FR); Georg Roentgen, Freiburg im Breisgau (DE)

(73) Assignee: Archroma (Switzerland) GmbH, Pratteln (CH)

( * ) Notice: Subject to any disclaimer, the term of this patent is extended or adjusted under 35 U.S.C. 154(b) by 0 days.

(21) Appl. No.: 18/833,795

(22) PCT Filed: Jan. 19, 2023

(86) PCT No.: PCT/EP2023/051254
§ 371 (c)(1),
(2) Date: Jul. 26, 2024

(87) PCT Pub. No.: WO2023/144005
PCT Pub. Date: Aug. 3, 2023

(65) Prior Publication Data
US 2025/0145831 A1    May 8, 2025

(30) Foreign Application Priority Data
Jan. 25, 2022    (EP) ..................... 22153149
May 9, 2022    (EP) ..................... 22172397

(51) Int. Cl.
| C09B 27/00 | (2006.01) |
| C09B 29/01 | (2006.01) |
| C09D 11/037 | (2014.01) |
| D06P 1/38 | (2006.01) |

(52) U.S. Cl.
CPC ........ C09B 29/0011 (2013.01); C09D 11/037 (2013.01); D06P 1/38 (2013.01)

(58) Field of Classification Search
CPC ...... C09B 29/0011; C09D 11/037; D06P 1/38
USPC .......................................................... 8/549
See application file for complete search history.

(56) References Cited

U.S. PATENT DOCUMENTS

| 4,341,699 A | 7/1982 | Tezuka et al. |
| 4,754,023 A | 6/1988 | Tzikas et al. |
| 5,298,607 A | 3/1994 | Seiler |

FOREIGN PATENT DOCUMENTS

| EP | 0094055 B1 | 11/1983 | |
| EP | 0567036 A1 * | 10/1993 | ........... C09B 62/245 |
| GB | 1576237 A | 10/1980 | |
| WO | 2023-144005 A1 | 8/2023 | |

OTHER PUBLICATIONS

STIC Search Report dated Apr. 16, 2025.*
International Search Report for corresponding European Patent Application No. PCT/EP2023/051254 dated Mar. 24, 2023.

* cited by examiner

*Primary Examiner* — Eisa B Elhilo
(74) *Attorney, Agent, or Firm* — Christensen, Fonder, Dardi & Herbert PLLC; Elizabeth A. Gallo

(57) ABSTRACT

The present invention relates to the field of isomeric mixture of reactive dyes that are suitable for the dyeing or printing of nitrogen-containing or hydroxy-group-containing fibre materials and yield on such materials dyeings or prints having a good build-up behaviour, a high fixation rate, good washing off properties of the unfixed dyes and good all-round fastness properties, as well as a good stability to various dyeing parameters such as a good bath stability. Furthermore, the present invention relates to a process for dyeing or printing of nitrogen-containing or hydroxy-group-containing fibre materials, wherein the isomeric mixture of reactive dyes according to the invention is used. The isomeric mixture of the present invention comprises at least an isomer of formula (Ia) and an isomer of formula (Ib).

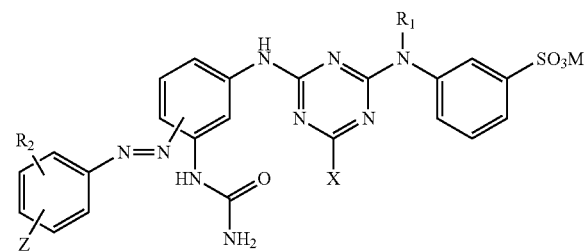

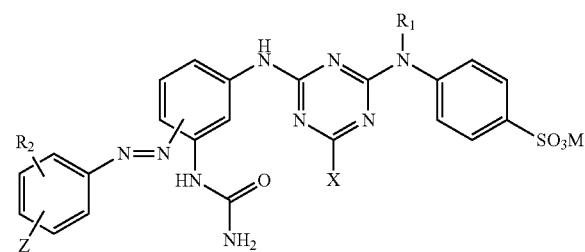

18 Claims, No Drawings

ISOMERIC MIXTURE OF REACTIVE DYES AND THEIR USE FOR THE DYEING OR PRINTING OF TEXTILE FIBRE MATERIALS

CROSS REFERENCE TO RELATED APPLICATIONS

This application is a National Stage filing of PCT Application No. PCT/EP2023/051254 filed Jan. 19, 2023, entitled "Isomeric Mixture of Reactive Dyes and Their Use for the Dyeing or Printing of Textile Fibre Materials", which claims priority to European Patent Application Nos. 22153149.4, filed Jan. 25, 2022, and 22172397.6, filed May 9, 2022.

FIELD OF INVENTION

The present invention relates to the field of isomeric mixture of reactive dyes that are suitable for the dyeing or printing of nitrogen-containing or hydroxy-group-containing fibre materials and yield on such materials dyeings or prints having a good build-up behaviour, a high fixation rate, good washing off properties of the unfixed dyes and good all-round fastness properties, as well as a good stability to various dyeing parameters such as a good bath stability.

Furthermore, the present invention relates to a process for dyeing or printing of nitrogen-containing or hydroxy-group-containing fibre materials, wherein the isomeric mixture of reactive dyes according to the invention is used.

BACKGROUND OF THE INVENTION

Over the past years, many countries have committed to improve the quality of the environment by saving natural resources and reducing the emission of substances which are harmful to the climate. Funds are provided by the governments to support the industry in achieving these goals. The consumer is asking for environmentally friendly textile products which are produced in accordance with highest ecological standards. Brands and retailers are conveying these demands into real requirements and textile manufacturers are continuously improving their production excellence by investing in modern equipment and selecting environmentally friendly chemical substances.

As a result, there is a huge demand for novel reactive dye mixtures that are suitable for the reproducible dyeing and printing of fibre materials which fulfill highest ecological and economical requirements while still providing dyeings of the desired colour shades with an improved stability to various dyeing parameters, such as an improved bath stability.

Suitable reactive dyes should also provide good fastness properties, such as wash and water fastness and perspiration fastness.

Furthermore, they should have sufficient substantivity and at the same time have good ease of washing off of unfixed dye. They should also exhibit a good tinctorial yield and high reactivity, the objective being to provide especially dyeing having good build-up properties and high degrees of fixing.

Reactive dyes which can be used for the dyeing and printing of hydroxyl-group-containing or nitrogen-containing fibre materials are known and described, for example, in EP 0 567 036. However, these dyes don't provide high degrees of fixing combined with a good stability to various dyeing parameters, especially a good bath stability.

The present invention is therefore based on the problem of providing new mixtures of reactive dyes that are suitable especially for the reproducible dyeing and printing of fibre materials in the desired colour shades and fulfil the above indicated requirements to the highest possible extent. The dye mixtures should also yield dyeing having good build-up properties, high fixation rates, good washing off properties of the unfixed dyes, and good all-round fastness properties, for example fastness to light and to wetting, as well as improved stability to various dyeing parameters such as improved bath stability.

The term "consists essentially of" followed by one or more characteristics, means that may be included in the process or the material of the invention, besides explicitly listed components or steps, components or steps that do not materially affect the properties and characteristics of the invention.

The expression "comprised between X and Y" includes boundaries, unless explicitly stated otherwise. This expression means that the target range includes the X and Y values, and all values from X to Y.

Throughout the description and claims of this specification, the words "comprise" and "contain" and variations of the words, for example "comprising" and "comprises", mean "including but not limited to", and do not exclude other moieties, additives, components, integers or steps. Moreover, the singular encompasses the plural unless the context otherwise requires: in particular, where the indefinite article is used, the specification is to be understood as contemplating plurality as well as singularity, unless the context requires otherwise.

Where upper and lower limits are quoted for a property, for example for the concentration of a component, then a range of values defined by a combination of any of the upper limits with any of the lower limits may also be implied.

SUMMARY OF THE INVENTION

The present invention concerns an isomeric mixture of at least one reactive dye of formula (I):

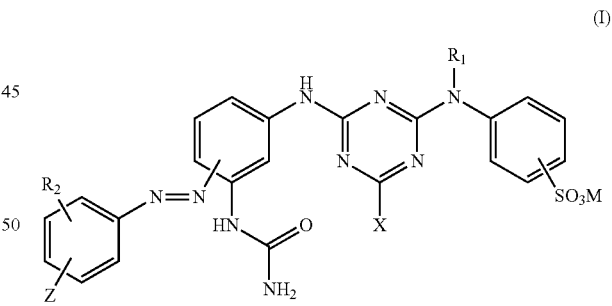

wherein,
$R_1$ is hydrogen or $C_1$-$C_4$alkyl,
$R_2$ is hydrogen, $C_1$-$C_4$alkyl, $C_1$-$C_4$alkoxy, sulfo, carboxy or halogen,
Z is a fibre-reactive radical of formula —$SO_2$—CH=$CH_2$, —$SO_2$—$(CH_2)_2$—Y, —NH—$(CH_2)_2$—O—$(CH_2)_2$—$SO_2$—CH=$CH_2$, —NH—$(CH_2)_2$—O—$(CH_2)_2$—$SO_2$—$(CH_2)_2$—Y, —NH—$(CH_2)_2$—O—$(CH_2)_3$—$SO_2$—CH=$CH_2$, —NH—$(CH_2)_2$—O—$(CH_2)_3$—$SO_2$—$(CH_2)_2$—Y, —NHCO—$(CH_2)_3$—$SO_2$—CH=$CH_2$ or —NHCO—$(CH_2)_3$—$SO_2$—$(CH_2)_2$—Y wherein Y is a group removable under alkaline conditions, X is halogen, and M is hydrogen, an organic salt, an alkali metal or one equivalent of an alkaline earth metal.

In a preferred embodiment, the isomeric mixture according to the invention comprises at least an isomer of formula (Ia):

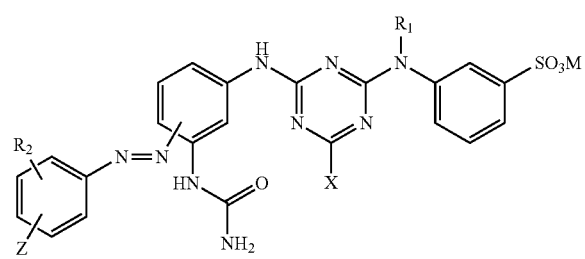
(Ia)

and an isomer of formula (Ib):

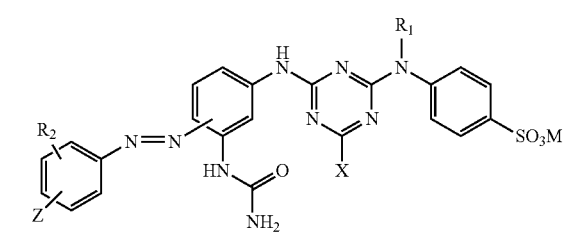
(Ib)

wherein, $R_1$, $R_2$, Z, X and M are defined above.

In one embodiment the isomeric mixture according to the invention comprises the isomer of formula (Ia) and the isomer of formula (Ib) in a weight ratio ranging from 1:4 to 4:1.

In one embodiment the isomeric mixture according to the invention comprises the isomer of formula (Ia) and the isomer of formula (Ib) in a weight ratio ranging from 1:4 to 1:1.

In one embodiment the isomeric mixture according to the invention comprises the isomer of formula (Ia) and the isomer of formula (Ib) in a weight ratio ranging from 3:7 to 2:3.

In one embodiment the isomeric mixture according to the invention comprises the isomer of formula (Ia) and the isomer of formula (Ib) in a weight ratio ranging from 4:1 to 1:1.

In one embodiment the isomeric mixture according to the invention comprises the isomer of formula (Ia) and the isomer of formula (Ib) in a weight ratio ranging from 7:3 to 3:2.

In a preferred embodiment, the isomeric mixture according to the invention comprises:

at least an isomer of formula (Ia) comprising the reactive dyes of formula (Ia1) and (Ia2):

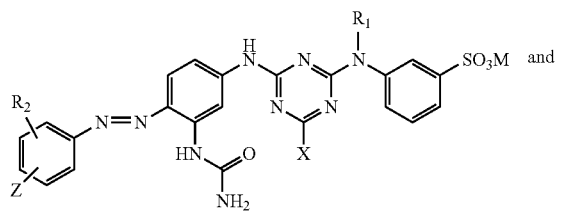
(Ia1)

(Ia2)

and, at least an isomer of formula (Ib) comprising a mixture of isomers of formula (IIa1) and (IIa2):

(Ib1)

(Ib2)

wherein, $R_1$, $R_2$, Z, X and M are defined above.

In a preferred embodiment, the isomeric mixture according to the invention comprises the isomer of formula (Ia)

comprising the reactive dyes of formula (Ia1) and (Ia2) and the isomer of formula (Ib) comprising the reactive dyes of formula (Ib1) and (Ib2) wherein the weight ratio of the reactive dyes (Ia1) and (Ib1) to the reactive dyes (Ia2) and (Ib2) is ranging from 6:4 to 99:1, preferably from 7:3 to 95:5, more preferably from 8:2 to 95:5.

In a preferred embodiment, $R_1$ is hydrogen, methyl, ethyl, n-propyl or n-butyl.

In a preferred embodiment, $R_2$ is hydrogen, methyl, ethyl, sulfo, carboxy or halogen.

The present invention also concerns a process for the preparation of an isomer mixture according to the invention, which comprises:

(a) diazotising a compound of the formula

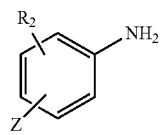

(1)

wherein $R_2$ and Z are defined above;
and reacting the diazonium salt so obtained with a coupling component of formula

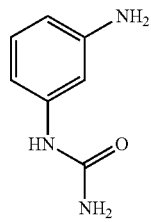

(2)

whereby an azo compound of formula

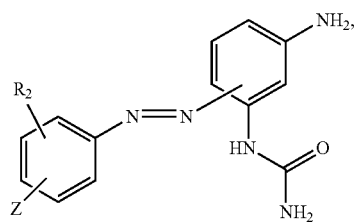

(3)

is obtained, wherein $R_2$ and Z are defined above;

(b) condensing the azo compound of formula (3) prepared in step (a) with a compound of formula

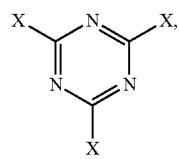

(4)

wherein X represent the same halogen as defined above, thereby providing a compound of formula

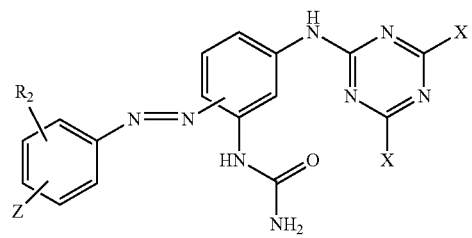

(5)

wherein $R_2$, Z and X are defined above;

(c) condensing the compound of the formula (5) prepared in step (b) with the isomeric mixture of compound of formula

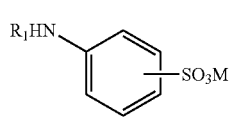

(6)

wherein $R_1$ and M are defined above,
thus providing the isomeric mixture of reactive dye of formula (1) according to the invention.

In a preferred embodiment, the isomeric mixture of compound of formula (6) comprises two isomers being one isomer with the sulfo group on meta position of the aniline and the other isomer with the sulfo group on para position of the aniline.

The present invention also concerns an aqueous inks comprising the isomeric mixture of at least one reactive dye of formula (1) according to the invention.

The present invention also concerns the use of an isomeric mixture of at least one reactive dye of formula (I) according to the invention or the ink according to the invention in the dyeing or printing of textile material such as hydroxyl-group-containing or nitrogen-containing fibre material, especially cellulosic fibre material.

The present invention also concerns a process for the dyeing or printing of textile material such as hydroxyl-group-containing or nitrogen-containing fibre material, especially cellulosic fibre material, which process comprises using the isomeric mixture of at least one reactive dye of formula (I) according to the invention or the aqueous ink according to the invention.

The present invention also concerns a textile dyed or printed with the isomeric mixture of at least one reactive dye of formula (I) according to the invention or the aqueous ink according to the invention.

DETAILED DESCRIPTION

Isomeric Mixture of Reactive Dyes of Formula (I)

The invention concerns an isomeric mixture of at least one reactive dye of formula (I):

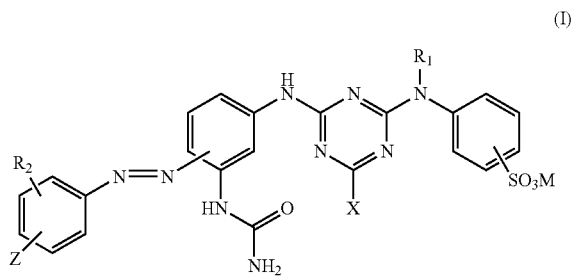

(I)

wherein, $R_1$ is hydrogen or $C_1$-$C_4$alkyl, $R_2$ is hydrogen, $C_1$-$C_4$alkyl, $C_1$-$C_4$alkoxy, sulfo, carboxy or halogen, Z is a fibre-reactive radical of formula —$SO_2$—CH=$CH_2$, —$SO_2$—$(CH_2)_2$—Y, —NH—$(CH_2)_2$—O—$(CH_2)_2$—$SO_2$—CH=$CH_2$, —NH—$(CH_2)_2$—O—$(CH_2)_2$—$SO_2$—$(CH_2)_2$—Y, —NH—$(CH_2)_2$—O—$(CH_2)_3$—$SO_2$—CH=$CH_2$, —NH—$(CH_2)_2$—O—$(CH_2)_3$—$SO_2$—$(CH_2)_2$—Y, —NHCO—$(CH_2)_3$—$SO_2$—CH=$CH_2$ or —NHCO—$(CH_2)_3$—$SO_2$—$(CH_2)_2$—Y wherein Y is a group removable under alkaline conditions, X is halogen, and M is hydrogen, an organic salt, an alkali metal or one equivalent of an alkaline earth metal.

The isomeric mixture of at least one reactive dye of formula (I) according to the invention provides very good build-up properties, high fixation rates, good washing off properties of the unfixed dyes, and good all-round fastness properties as well as improved stability to various dyeing parameters, especially improved bath stability.

"Isomers" and "isomeric mixtures" as used herein include dyes with the same chemical formula but a different arrangement of atoms. According to the invention, the isomeric mixture of reactive dyes of formula (I) comprises reactive dyes with the same chemical formula and thus the same carbon number, but with —$SO_3M$ moiety attached at different positions on the phenyl ring.

The term "isomeric mixture" as used herein, means a composition comprising more than one isomer of a reactive dye.

The "isomeric mixture of at least one reactive dye" optionally contains isomers of more than one reactive dye of formula (I). As such, the isomeric mixture contains more than one (i.e., two or more) isomers of a reactive dye of formula (I) and also can contain more than one (i.e., two or more) isomers of a different reactive dye of formula (I). Different reactive dye of formula (I) has different chemical formula comprising in formula (I) and thus different carbon number. For example, an isomeric mixture of at least one reactive dye of formula (I) includes a β-vinylsulfonyl reactive dyes of formula (I) and its isomers and β-sulfatoethylsulfonyl reactive dyes of formula (I) and its isomers (the isomers having the sulfonic substituent attached at different positions on the phenyl ring).

These isomeric mixtures as disclosed herein are distinguished from single reactive dyes of formula (I).

By "Ci-Cj alkyl" is meant a saturated, linear or branched hydrocarbon-containing chain, comprising from i to j carbon atoms.

By "$C_1$-$C_4$ alkyl" is meant a saturated, linear or branched hydrocarbon-containing chain comprising from 1 to 4 carbon atoms. Preferably, the hydrocarbon-containing chain is linear. Preferably, the $C_1$-$C_4$ alkyl group is selected from the group formed by methyl, ethyl, n-propyl, i-propyl, n-butyl, s-butyl, i-butyl or t-butyl. More preferably, the $C_1$-$C_4$ alkyl group is selected from the group formed by methyl, ethyl, n-propyl, n-butyl. Advantageously, the $C_1$-$C_4$ alkyl group is methyl or ethyl.

By "$C_1$-$C_4$ alkoxy" is meant a saturated, linear or branched hydrocarbon-containing chain comprising from 1 to 4 carbon atoms and substituted by an oxygen atom. Preferably, the hydrocarbon-containing chain is linear. Preferably, the $C_1$-$C_4$ alkoxy group is selected from the group formed by methoxy, ethoxy, n-propoxy, i-propoxy, n-butoxy, s-butoxy, i-butoxy or t-butoxy. More preferably, the $C_1$-$C_4$ alkoxy group is selected from the group formed by methoxy, ethoxy, n-propoxy, n-butoxy. Advantageously, the $C_1$-$C_4$ alkoxy group is methoxy or ethoxy.

As used herein, the term "halogen" refers to a fluorine atom, a chlorine atom or a bromine atom, preferably a fluorine atom or a chlorine atom.

As used herein, the term "sulfo" refers to a —$SO_3M$ group. Sulfo groups —SO3M are present either in free acid form (M is hydrogen) or, preferably, in salt form. Suitable salts are, for example, alkali metal or alkaline earth metal salts. Further salts which come into consideration are organic amine salts, ammonium salts, or mixtures thereof. Examples that may be mentioned are sodium, lithium, potassium or ammonium salts, a mono-, di- or tri-ethanolamine salt or mixed Na/Li or Na/Li/NH4 salts.

As used herein, the term "Y" refers to a group removable under alkaline conditions selected from the group consisting of —Cl, —Br, —F, —$OSO_3M$, —$SSO_3M$, —OCO—$CH_3$, —$OPO_3M_2$, —OCO—$C_6H_5$, —$OSO_2$—$C_1$-$C_4$alkyl or —$OSO_2$—N($C_1$-$C_4$alkyl)$_2$. Preferably, Y is selected from the group consisting of —Cl, —$OSO_3M$, —$SSO_3M$, —OCO—$CH_3$, —OCO—$C_6H_5$ or —$OPO_3M_2$, more preferably —Cl or —$OSO_3M$, wherein M has the meanings given above.

In a preferred embodiment, $R_1$ is hydrogen, methyl, ethyl, n-propyl or n-butyl. More preferably, $R_1$ is hydrogen, methyl or ethyl. Advantageously, $R_1$ is ethyl.

In a preferred embodiment, $R_2$ is hydrogen, methyl, ethyl, sulfo, carboxy or halogen. More preferably, $R_2$ is hydrogen, sulfo or halogen. Advantageously, $R_2$ is sulfo.

In a more preferred embodiment, the isomeric mixture of at least one reactive dye of formula (I) wherein:

$R_1$ is ethyl, $R_2$ is sulfo,

Z is a fibre-reactive radical of formula —$SO_2$—CH=$CH_2$ or —$SO_2$—$(CH_2)_2$—Y wherein Y is a group removable under alkaline conditions, X is a fluorine atom, and M is hydrogen, an organic salt, an alkali metal or one equivalent of an alkaline earth metal.

In a preferred embodiment, the isomeric mixture according to the invention comprises at least an isomer of formula (Ia):

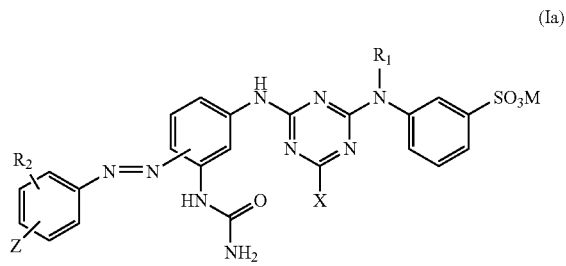
(Ia)

and an isomer of formula (Ib):

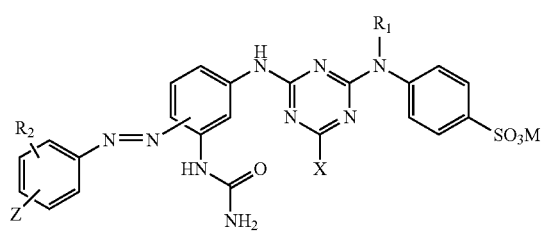
(Ib)

wherein,

R₁, R₂, Z, X and M each have the meanings and preferred meanings given above.

In one embodiment the isomeric mixture according to the invention comprises the isomer of formula (Ia) and the isomer of formula (Ib) in a weight ratio ranging from 1:4 to 4:1.

In one embodiment the isomeric mixture according to the invention comprises the isomer of formula (Ia) and the isomer of formula (Ib) in a weight ratio ranging from 1:4 to 1:1.

In one embodiment the isomeric mixture according to the invention comprises the isomer of formula (Ia) and the isomer of formula (Ib) in a weight ratio ranging from 3:7 to 2:3.

In one embodiment the isomeric mixture according to the invention comprises the isomer of formula (Ia) and the isomer of formula (Ib) in a weight ratio ranging from 4:1 to 1:1.

In one embodiment the isomeric mixture according to the invention comprises the isomer of formula (Ia) and the isomer of formula (Ib) in a weight ratio ranging from 7:3 to 3:2.

Advantageously, the mixture of the isomers of formulae (Ia) and (Ib) in said ratio provides to the isomeric mixture according to the invention an improved stability to various dyeing parameters, especially an improved bath stability, when compared to the stability of the isomers taken alone. Notably, the mixture of the isomers of formulae (Ia) and (Ib) in said ratio according to the invention has a synergistic effect regarding the bath stability of said mixture when compared to the bath stability of the isomers taken alone.

In another preferred embodiment, the isomeric mixture according to the invention comprises at least an isomer of formula (Ia) comprising the reactive dyes of formula (Ia1) and (Ia2):

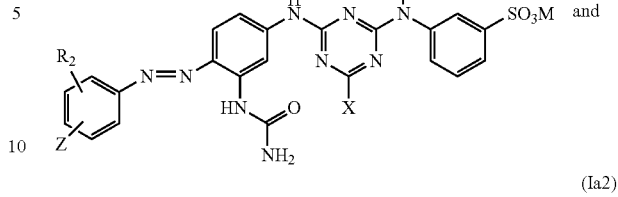
(Ia1) and

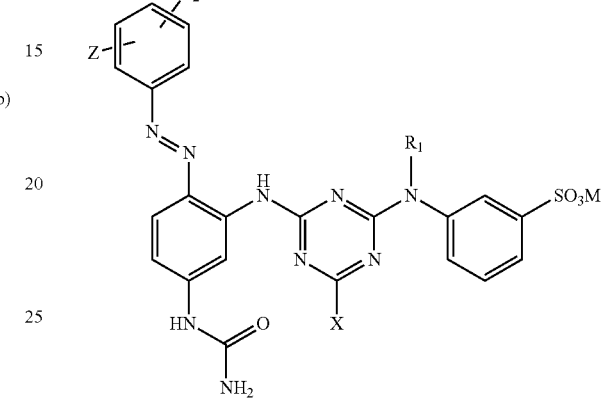
(Ia2)

and, at least an isomer of formula (Ib) comprising a mixture of isomers of formula (IIa1) and (IIa2):

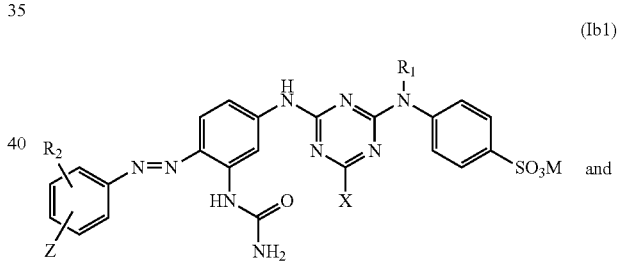
(Ib1) and

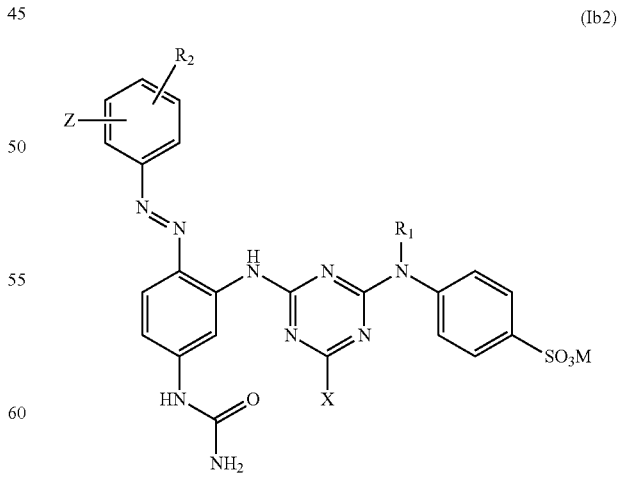
(Ib2)

wherein,

R₁, R₂, Z, X and M each have the meanings and preferred meanings given above.

In a preferred embodiment, the isomeric mixture according to the invention comprises the isomer of formula (Ia) comprising the reactive dyes of formula (Ia1) and (Ia2) and the isomer of formula (Ib) comprising the reactive dyes of formula (Ib1) and (Ib2) wherein the weight ratio of the reactive dyes (Ia1) and (Ib1) to the reactive dyes (Ia2) and (Ib2) is ranging from 6:4 to 99:1, preferably from 7:3 to 95:5, more preferably from 8:2 to 95:5.

In a preferred embodiment, the isomeric mixture according to the invention comprises at least:
an isomer of formula (IIa):

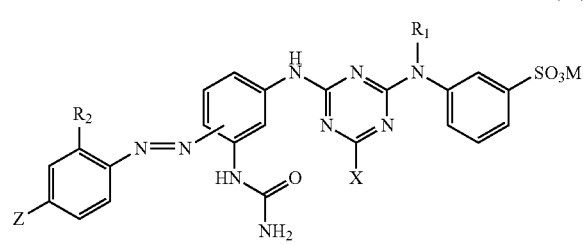
(IIa)

and,
an isomer of formula (IIb):

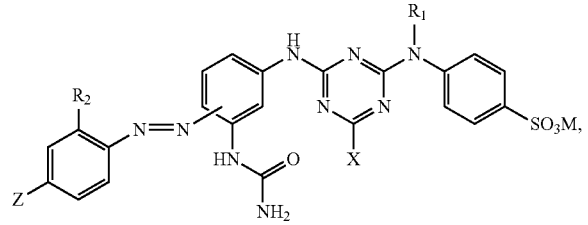
(IIb)

wherein
R$_1$, R$_2$, Z, X and M each have the meanings and preferred meanings given above.

In said preferred embodiment, the isomeric mixture according to the invention comprises advantageously at least:
an isomer of formula (IIIa):

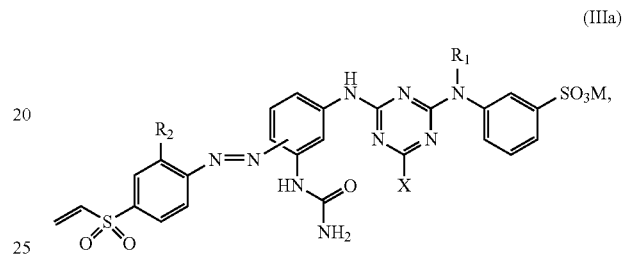
(IIIa)

an isomer of formula (IIIb):

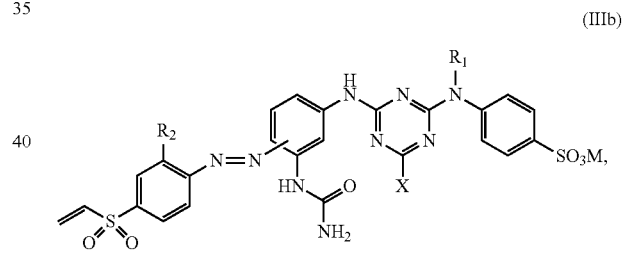
(IIIb)

an isomer of formula (IIIc):

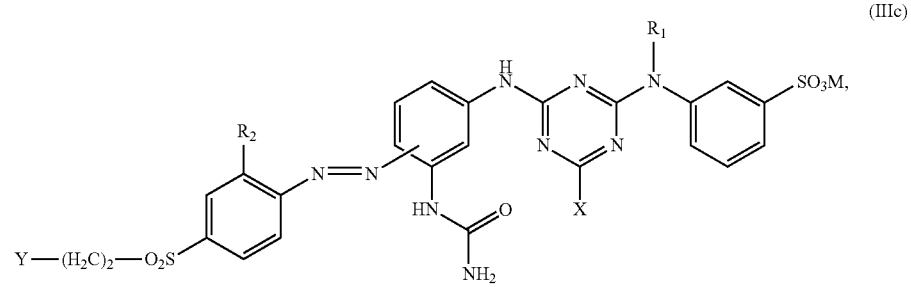
(IIIc)

and
an isomer of formula (IIId):

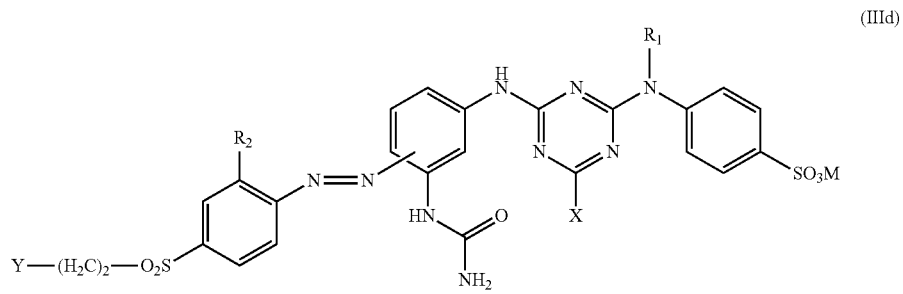

wherein
$R_1$, $R_2$, X and M each have the meanings and preferred meanings given above.

The isomeric mixture of the reactive dye of formula (1) according to the present invention is present either in the form of the free acid or, preferably, in the form of a salt thereof. Salts that come into consideration are, for example, the alkali metal, alkaline earth metal and ammonium salts or the salts of an organic amine. Sodium, lithium, potassium and ammonium salts and the salts of mono-, di- and tri-ethanolamine may be mentioned as examples.

In a preferred embodiment, the isomeric mixture according to the invention may comprise further additives, for example sodium chloride or dextrin.

If desired, the isomeric mixture according to the invention may comprise further auxiliaries which, for example, improve handling or increase storage stability, such as buffers, dispersants or anti-dusts. Such auxiliaries are known to the person skilled in the art.

In an embodiment, the isomeric mixture according to the invention is suitable for textile, especially for the dyeing or printing of nitrogen-containing or hydroxy-group-containing fibre materials.

As used herein, the terms "textile", "textile material" and "fibre material" have to be interpreted broad and can be in a very wide range of forms of presentations, for example, in the form of fibers, yarns, fabrics, garments, knits, wovens and non-wovens. The copolymers according to the invention are suitable for treating a wide variety of textile materials. The textile according to the present invention is hydroxy-group-containing or nitrogen-containing fibre material, especially cellulosic fibre material. The textile according to the present invention can be a natural or synthetic textiles such as cotton, silk, wool, linen, polyamides, polyurethanes, polyacrylics, polyesters, polyolefines, polylactide and hemp, or also blends of natural textile material with synthetic textile material (i.e. polyamides, polyurethanes, polyacrylics, polyesters, polyolefines or polylactide) such as blends of cotton and polyester fibres or polyamide fibres.

Process for the Preparation of the Isomer Mixture According to the Invention

The invention also concerns a process for the preparation of an isomer mixture of at least one reactive dye of formula (I), which comprises:

(a) diazotising a compound of the formula

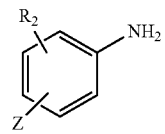

(1)

wherein $R_2$ and Z have the meanings as defined above;
and reacting the diazonium salt so obtained with a coupling component of formula

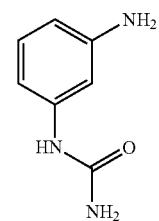

(2)

whereby an azo compound of formula

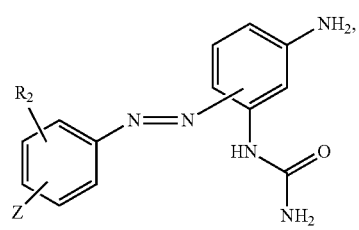

(3)

is obtained, wherein $R_2$ and Z are as defined above;
(b) condensing the azo compound of formula (3) prepared in step (a) with a compound of formula

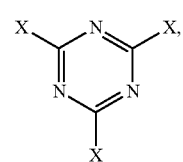

(4)

wherein X represent the same halogen as defined above, thereby providing a compound of formula

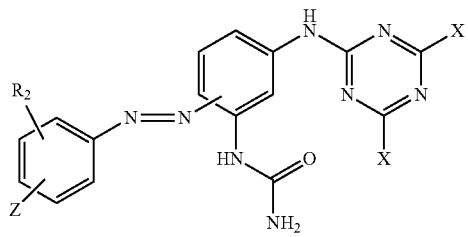

(5)

wherein $R_2$, Z and X are as defined above;
(c) condensing the compound of the formula (5) prepared in step (b) with the isomeric mixture of compound of formula

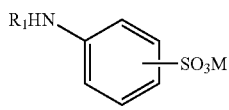

(6)

wherein $R_1$ and M are as defined above,
thus providing the isomeric mixture of reactive dye of formula (1) according to the invention.

The isomeric mixture of reactive dye of formula (1) obtained at step (c) can optionally also be subjected to a transformation reaction. Such a transformation reaction is, for example, the conversion of a vinylatable reactive group —$SO_2$—Y into its vinyl form by treatment with dilute sodium hydroxide solution, such as, for example, the conversion of the β-chloroethylsulfonyl radical or β-sulfatoethylsulfonyl radical into the vinylsulfonyl radical. Such reactions are known per se. Those transformation reactions are generally affected in a neutral to alkaline medium at a temperature of, for example, from 20 to 70° C., at a pH of, for example, from 6 to 14.

Suitable compounds of formula (1) are, for example, 2-hydroxy-4-β-sulfatoethyl-1-aminobenzene, 2-methoxy-4-β-sulfatoethyl-1-aminobenzene, and 2-sulfo-4-β-sulfatoethyl-1-aminobenzene, and are commercially available.

In step (a) the amines of formula (1) are generally diazotised at low temperature, for example 0° C. to 40° C., in an aqueous mineral acid solution through the action of nitrous acid and the reaction with the coupling component of formula (2) is carried out at a weakly acid, neutral or weakly alkaline pH.

The compound of formula (3) can be prepared in accordance with processes known per se, such as by customary diazotization and coupling reactions as described, for example, in U.S. Pat. No. 4,341,699, GB-A-1576237, U.S. Pat. No. 4,754,023, EP-A-94055 and U.S. Pat. No. 5,298,607.

Suitable compounds of formula (4) are, for example cyanuric fluoride or cyanuric chloride and are commercially available.

In step (b), the azo compound of formula (3) is condensed with the compound of formula (4) in aqueous solution, at low temperature, for example 0° C. to 40° C., and at weakly acid, neutral or weakly alkaline pH.

In step (c), the intermediate of formula (5) is condensed with the isomeric mixture of compound of formula (6) at low temperature, for example 0° C. to 40° C., in an aqueous mineral acid solution and at a weakly acid, neutral or weakly alkaline pH.

In a preferred embodiment, the isomeric mixture of compound of formula (6) comprises two isomers being one isomer with the sulfo group on meta position of the aniline and the other isomer with the sulfo group on para position of the aniline.

Suitable isomeric mixture of compound of formula (6) is for example a mixture of N-ethyl-3-sulfoaniline and N-ethyl-4-sulfoaniline and said isomers are commercially available.

The isomeric mixture can be synthetized by sulfonation of N-ethylaniline or can be obtained by physically mixing the two isomers.

In a preferred embodiment, the isomeric mixture of compound of formula (6) has a weight ratio between the isomer with the sulfo group on meta position of the aniline (N-ethyl-3-sulfoaniline) and the isomer with the sulfo group on para position of the aniline (N-ethyl-4-sulfoaniline) from 1:4 to 4:1, preferably 1:4 to 1:1, more preferably from 3:7 to 2:3.

In a preferred embodiment, the isomeric mixture of compound of formula (6) has a weight ratio between the isomer with the sulfo group on meta position of the aniline (N-ethyl-3-sulfoaniline) and the isomer with the sulfo group on para position of the aniline (N-ethyl-4-sulfoaniline) from 1:4 to 4:1, preferably 4:1 to 1:1, more preferably from 7:3 to 3:2.

Advantageously, the mixture of compound of formula (6) in said ratio leads obtaining the isomeric mixture of reactive dyes of formula (1) according to the invention in the same ratio allowing having an improved stability to various dyeing parameters, especially an improved bath stability, when compared to the stability of the isomers taken alone. Notably, the mixture of the isomers of reactive dyes of formula (1) in said ratio according to the invention has a synergistic effect regarding the bath stability of said mixture when compared to the bath stability of the isomers taken alone.

Because the individual process steps mentioned above may be carried out in different orders as well as, where appropriate in some cases, simultaneously, different process variants are possible. The reaction is generally carried out in stepwise succession, the order of the simple reactions, known per se, between the individual reaction components being determined by the particular conditions.

Compositions and Uses

The present invention also concerns an aqueous ink comprising the isomeric mixture of at least one reactive dye of formula (1) according to the invention and to the use of such inks in an ink-jet printing method for printing a variety of substrates, especially textile fibre materials, the definitions and preferences indicated above applying to the dyes, the inks and the substrates.

The isomeric mixture of at least one reactive dye of the present invention shows very good build-up behaviour, a high end build-up and a high degree of fixation, especially in printing applications on cellulosic fibre materials, as well as an improved stability towards varying printing parameters.

The isomeric mixture of reactive dyes of formula (1) according to the invention are also suitable as colorants for use in recording systems. Such recording systems are, for example, commercially available ink-jet printers for paper or textile printing, or writing instruments, such as fountain pens or ballpoint pens, and especially ink-jet printers. For that purpose, the dyes according to the invention are first brought into a form suitable for use in recording systems. A suitable form is, for example, an aqueous ink, which comprises the isomeric mixture according to the invention as colorants. The inks can be prepared in customary manner by mixing together the individual components in the desired amount of water.

As substrates there come into consideration the above-mentioned hydroxyl-group-containing or nitrogen-containing fibre materials, especially cellulosic fibre materials. The fibre materials are preferably textile fibre materials.

Substrates that also come into consideration are paper and plastics films.

As examples of paper there may be mentioned commercially available ink-jet paper, photo paper, glossy paper, plastics-coated paper, e.g. Epson Ink-jet Paper, Epson Photo Paper, Epson Glossy Paper, Epson Glossy Film, HP Special Ink-jet Paper, Encad Photo Gloss Paper and Ilford Photo Paper. Plastics films are, for example, transparent or cloudy/opaque. Suitable plastics films are, for example, 3M Transparency Film.

Depending on the nature of the use, for example textile printing or paper printing, it may be necessary, for example, for the viscosity or other physical properties of the ink, especially properties that have an influence on the affinity for the substrate in question, to be adapted accordingly.

The isomeric mixture according to the invention used in the aqueous inks should preferably have a low salt content, that is to say they should have a total content of salts of less than 0.5% by weight, based on the weight of the dyes. Dyes that have relatively high salt contents as a result of their preparation and/or as a result of the subsequent addition of diluents can be desalted, for example by membrane separation procedures, such as ultrafiltration, reverse osmosis or dialysis.

The inks preferably have a total content of isomeric mixture according to the invention from 1 to 35% by weight, especially from 1 to 30% by weight and preferably from 1 to 20% by weight, based on the total weight of the ink. The preferred lower limit in this case is a limit of 1.5% by weight, preferably 2% by weight and especially 3% by weight.

The inks may comprise water-miscible organic solvents, for example C1-C4alcohols, e.g. methanol, ethanol, n-propanol, isopropanol, n-butanol, sec-butanol, tert-butanol or iso-butanol; amides, e.g. dimethylformamide or dimethylacetamide; ketones or ketone alcohols, e.g. acetone or diacetone alcohol; ethers, e.g. tetrahydrofuran or dioxane; nitrogen-containing heterocyclic compounds, e.g. N-methyl-2-pyrrolidone or 1,3-dimethyl-2-imidazolidone, poly-alkylene glycols, e.g. polyethylene glycol or polypropylene glycol; C2 C6alkylene glycols and thio¬glycols, e.g. ethylene glycol, propylene glycol, butylene glycol, triethylene glycol, thio-diglycol, hexylene glycol and diethylene glycol; other polyols, e.g. glycerol or 1,2,6-hexane-triol; and C1-C4alkyl ethers of polyhydric alcohols, e.g. 2-methoxy¬ethanol, 2-(2-methoxy-ethoxy)ethanol, 2-(2-ethoxyethoxy)ethanol, 2-[2-(2-methoxy¬ethoxy)ethoxy]ethanol or 2-[2-(2-ethoxy-ethoxy)ethoxy]ethanol; preferably N-methyl-2-pyrrolidone, diethylene glycol, glycerol or especially 1,2-propylene glycol, usually in an amount of from 2 to 30% by weight, especially from 5 to 30% by weight and preferably from 10 to 25% by weight, based on the total weight of the ink.

In addition, the inks may also comprise solubilisers, e.g. β-caprolactam.

The inks may comprise thickeners of natural or synthetic origin, inter alia for the purpose of adjusting the viscosity. Examples of thickeners that may be mentioned include commercially available alginate thickeners, starch ethers or locust bean flour ethers, especially sodium alginate on its own or in admixture with modified cellulose, e.g. methyl cellulose, ethyl cellulose, carboxymethyl cellulose, hydroxyethyl cellulose, methyl hydroxyethyl cellulose, hydroxypropyl cellulose or hydroxypropyl methyl cellulose, especially with preferably from 20 to 25% by weight carboxymethyl cellulose. Synthetic thickeners that may also be mentioned are, for example, those based on poly(meth)acrylic acids or poly(meth)acrylamides and also polyalkylene glycols having a molecular weight of, for example, from 2000 to 20 000, such as, for example, polyethylene glycol or polypropylene glycol or mixed polyalkylene glycols of ethylene oxide and propylene oxide.

The inks contain such thickeners, for example, in an amount of from 0.01 to 2% by weight, especially from 0.01 to 1% by weight and preferably from 0.01 to 0.5% by weight, based on the total weight of the ink.

The inks may also comprise buffer substances, e.g. borax, borates, phosphates, poly-phosphates or citrates. Examples that may be mentioned include borax, sodium borate, sodium tetraborate, sodium dihydrogen phosphate, disodium hydrogen phosphate, sodium tripolyphosphate, sodium pentapolyphosphate and sodium citrate. They are used especially in amounts of from 0.1 to 3% by weight, preferably from 0.1 to 1% by weight, based on the total weight of the ink, in order to establish a pH value of, for example, from 4 to 9, especially from 5 to 8.5.

As further additives, the inks may comprise surfactants or humectants.

Suitable surfactants include commercially available anionic or non-ionic surfactants. As humectants in the inks according to the invention there come into consideration, for example, urea or a mixture of sodium lactate (advantageously in the form of a 50% to 60% aqueous solution) and glycerol and/or propylene glycol in amounts of preferably from 0.1 to 30% by weight, especially from 2 to 30% by weight.

Preference is given to inks having a viscosity of from 1 to 40 mPa·s, especially from 1 to 20 mPa·s and more especially from 1 to 10 mPa·s.

Furthermore, the inks may in addition comprise customary additives, e.g. anti-foams or especially preservatives that inhibit fungal and/or bacterial growth. Such additives are usually used in amounts of from 0.01 to 1% by weight, based on the total weight of the ink.

As preservatives there come into consideration formaldehyde-yielding agents, for example paraformaldehyde and trioxane, especially aqueous, approximately from 30 to 40% by weight formaldehyde solutions, imidazole compounds, for example 2-(4-thiazolyl)-benzimidazole, thiazole compounds, for example 1,2-benzisothiazolin-3-one or 2-n-octyl-isothiazolin-3-one, iodine compounds, nitriles, phenols, haloalkylthio compounds or pyridine derivatives, especially 1,2-benzisothiazolin-3-one or 2-n-octyl-isothiazolin-3-one. A suitable preservative is, for example, a 20% by weight solution of 1,2-benzisothiazolin-3-one in dipropylene glycol (Proxel® GXL).

The inks may in addition comprise further additives, such as fluorinated polymers or telomers, for example polyethoxyperfluoroalcohols (Forafac® or Zonyl® products) in an amount of, for example, from 0.01 to 1% by weight, based on the total weight of the ink.

In the case of the ink-jet printing method, individual droplets of ink are sprayed onto a substrate from a nozzle in a controlled manner. It is mainly the continuous ink-jet method and the drop-on-demand method that are used for that purpose. In the case of the continuous ink-jet method, the droplets are produced continuously, droplets not required for the printing operation being discharged into a receptacle and recycled. In the case of the drop-on-demand method, on the other hand, droplets are generated as desired and used for printing; that is to say, droplets are generated only when required for the printing operation. The production of the droplets can be effected, for example, by means of a piezo ink-jet head or by thermal energy (bubble jet). Preference is given to printing by means of a piezo ink-jet head and to printing according to the continuous ink-jet method.

The present invention also concerns the use of an isomeric mixture of at least one reactive dye of formula (I) according to the invention or the ink according to the invention in the dyeing or printing of textile material such as hydroxyl-group-containing or nitrogen-containing fibre material, especially cellulosic fibre material, or in other words, a process for the dyeing or printing of textile material such as hydroxyl-group-containing or nitrogen-containing fibre material, especially cellulosic fibre material, wherein an isomeric mixture of at least one reactive dye of formula (I) according to the invention or an ink according to the invention is used.

The isomeric mixture according to the invention or the ink according to the invention are suitable for customary dyeing and printing methods and can be applied to the fibre material and fixed thereto in a wide variety of ways, especially in the form of aqueous dye solutions or print pastes.

The process for dyeing and printing of hydroxy-group-containing or nitrogen-containing fibre materials according to the invention can be carried out in accordance with customary dyeing and printing methods, for example, according to the so-called cold pad-batch process, in which the isomeric mixture according to the invention is applied, together with the alkali, on the padder and is then fixed by storage for several hours at about room temperature, for example, from 25 to 35° C. Alternatively, the process for dyeing and printing according to the invention can be carried out according to the exhaust-dyeing method, in which the goods are impregnated with aqueous, optionally salt-containing isomeric mixture solution according to the invention, and the isomeric mixture is fixed after an alkali treatment or in the presence of alkali, optionally under the action of heat.

The amounts in which the isomeric mixture according to the invention or the ink according to the invention is used for dyeing or for printing can vary within wide limits in dependence upon the desired depth of shade; in general, amounts of from 0.01 to 15% by weight, especially from 0.1 to 10% by weight, based on the goods being dyed or printed, have proved advantageous.

The present invention also concerns a textile dyed or printed with the isomeric mixture of at least one reactive dye of formula (I) according to the invention or the aqueous ink according to the invention.

The dyeings and prints produced using the isomeric mixture according to the invention have a high tinctorial strength and a high fibre-dye binding stability in both the acidic and the alkaline range, are remarkable through their Non photochromic character, and also have good light and chlorine fastnesses, good wash-off behaviour, good bath stability, excellent operational excellence (reproducibility, fixing time, etc.)

The following Examples serve to illustrate the invention. Unless otherwise indicated, temperatures are given in degrees Celsius, masses are expressed as g/g (100% active ingredient), parts are parts by weight and percentages relate to percent by weight, ratio are expressed as molar equivalent value. Parts by weight relate to parts by volume in a ratio of kilograms to litres.

EXAMPLES

For maintaining pH to appropriated values, either hydrochloric acid 32% solution, sodium carbonate 20% solution or sodium hydroxide 30% solution is used,
Water and ice are used for cooling steps,
Reactions are monitored using HPLC analysis method, this latter indicating the end of reaction,
All products used for synthesis are commercially available.

Examples 1a and 1b (a) 109.0 g of 2-Amino-5-((2-(sulfatooxy)ethyl)sulfonyl-benzenesulfonic finely dispersed in 200 parts of water, are diazotized according to the following procedure:
  (a1) mixing 2-Amino-5-((2-(sulfatooxy)ethyl)sulfonyl-benzenesulfonic acid and hydrochloric acid 32% solution in water with the stoichiometry (HCl 32%: 2-Amino-5-((2-(sulfatooxy)ethyl)sulfonyl-benzenesulfonic acid) of 2.0-3.0:1.0,
  (a2) diazotization the mixture obtained in step (a1) with a 4N solution of sodium nitrite in slight molar excess (sodium nitrite:mixture obtained in step (a1)) of 1.05-1.1:1.0 to ensure complete diazotization, at 0-30° C.
  (a3) the reaction mixture obtained in step (a2) is stirred for one hour and excess of nitrite is neutralized by addition of sulfamic acid 10% solution, thus providing the required diazonium salt.

Then, 46.0 g of 3-Aminophenylurea previously dispersed in water, is cooled down with ice and coupled by adding the diazonium salt mixture obtained at the step (a3) at 0-30° C. being kept by ice addition and, at pH 4.5-6.0 being kept by addition of sodium carbonate 20% solution. After coupling completion, the reaction mass is warmed to 25-40° C. and treated with HCl 32% solution for triazene removal at pH 1.0-1.5 for 1 to 3 hours. Then, the mixture obtained is then cooled down to 20-25° C. and dissolved at pH 6.5-7.0 using sodium carbonate 20% solution.

(b) The mixture obtained at step (a) is cooled with ice at 0-5° C. and at pH 6.0-8.0, and 53.0 g of cyanuric fluoride are added to said mixture within 5-20 min. The pH of said mixture is kept at this value by addition of sodium hydroxide 30% solution and temperature is kept within 0-5° C. by addition of ice. The resulting mixture is stirred for 5-10 within the above-described conditions after addition completion. Then, hydrochloric acid 32% solution is added to the resulting mixture to set up the pH at 3.0-4.0 while the temperature remains in above values by addition of ice.

(c) A mixture of N-ethyl-3-sulfoaniline and N-ethyl-4-sulfoaniline has been prepared by physical mixing (N-ethyl-3-sulfoaniline:N-ethyl-4-sulfoaniline).
  (c-1) in a molar ratio of 3:2 for example (1a) as formula (101a), or
  (c-2) in a molar ratio of 2:3 for example (1b) as formula (101b)

The mixture obtained in step (b) having a pH at 3.0-4.0 has been cooled at a temperature of 0-5° C. and, 57.0 g of the mixture (N-ethyl-3-sulfoaniline:N-ethyl-4-sulfoaniline) given in (c) as (c-1) or (c-2) over a 5-10 min time are added to said mixture. During addition, pH is set up and maintained at 6.0-7.0 with sodium hydroxide 30% solution and the temperature is kept below 10° C. After addition completion, the reaction mas is stirred for 20-30 min under same conditions as above, then heated to 20-30° C. while keeping the pH at 6.0-7.0 and stirred for 2-4 hours under these conditions.

After reaction completion, the reaction mass is heated up to 30-50° C., submitted to reverse osmosis process and dried, leading to the crude isomeric mixture of reactive dye which main component, in the form of the free acid, corresponds to the formula (101a) or (101b) respectively:

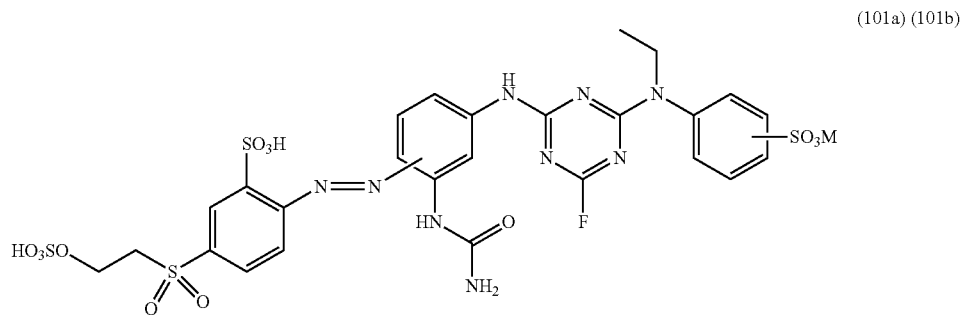
(101a) (101b)

Examples 2a and 2b and Comparative Examples 3-5

The following dyes can be prepared in a manner analogous to that described in Example 1.

Ex. 2a and 2b

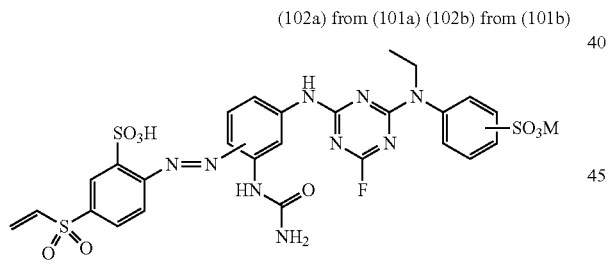
(102a) from (101a) (102b) from (101b)

Comparative Ex. 3

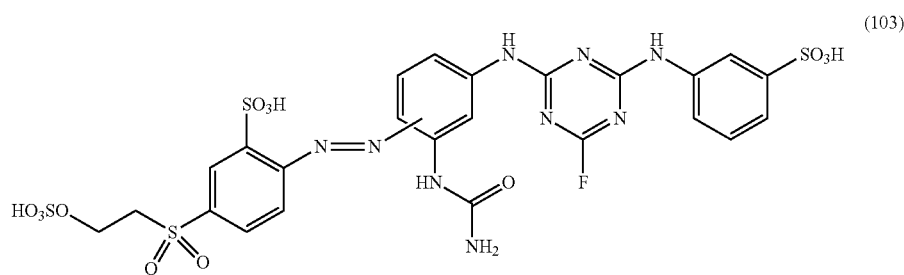
(103)

Comparative Ex. 4

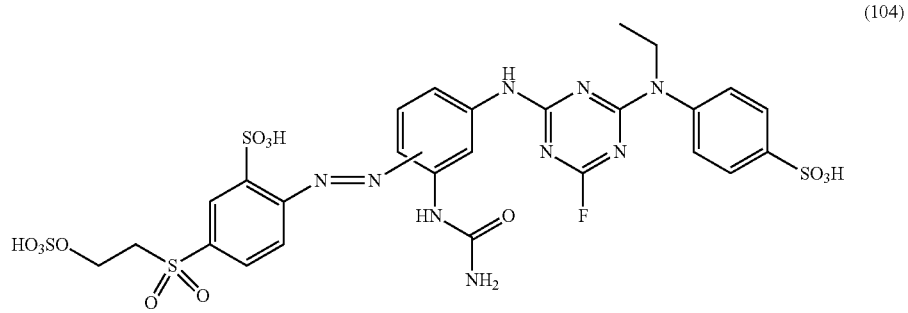
(104)

Comparative Ex. 5

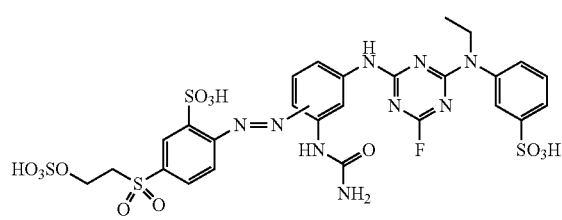
(105)

Comparative Ex. 6

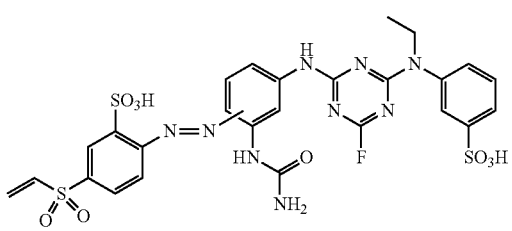
(106)

Comparative Example 7

(a) 109.0 g of 2-Amino-5-((2-(sulfatooxy)ethyl)sulfonyl-benzenesulfonic finely dispersed in 200 parts of water, are diazotized according to the following procedure:

(a1) mixing 2-Amino-5-((2-(sulfatooxy)ethyl)sulfonyl-benzenesulfonic acid and hydrochloric acid 32% solution in water with the stoichiometry (HCl 32%:2-Amino-5-((2-(sulfatooxy)ethyl)sulfonyl-benzenesulfonic acid) of 2.0-3.0:1.0, (a2) diazotization the mixture obtained in step (a1) with a 4N solution of sodium nitrite in slight molar excess (sodium nitrite:mixture obtained in step (a1)) of 1.05-1.1:1.0 to ensure complete diazotization, at 0-30° C.

(a3) the reaction mixture obtained in step (a2) is stirred for one hour and excess of nitrite is neutralized by addition of sulfamic acid 10% solution, thus providing the required diazonium salt.

Then, 46.0 g of 3-Aminophenylurea previously dispersed in water, is cooled down with ice and coupled by adding the diazonium salt mixture obtained at the step (a3) at 0-30° C. being kept by ice addition and, at pH 4.5-6.0 being kept by addition of sodium carbonate 20% solution. After coupling completion, the reaction mass is warmed to 25-40° C. and treated with HCl 32% solution for triazene removal at pH 1.0-1.5 for 1 to 3 hours. Then, the mixture obtained is then cooled down to 20-25° C. and dissolved at pH 6.5-7.0 using sodium carbonate 20% solution.

(b) 55.5 g of cyanuric chloride are suspended in water with 1 g of buffer (hydrogen disodium phosphate) and ice. The temperature of said suspension is set up at 0-5° C. and the mix is stirred for 10 min under vigorous stirring with the use of a dispersing apparatus.

The mixture obtained at step (a) is cooled with ice at 0-5° C. and at pH 6.0-8.0, and 55.5 g of cyanuric chloride is rapidly (less than 1 min) added to said mixture. The pH of said mixture is adjusted and maintained at 5.0-6.0 for one hour at 15-25° C. by addition of sodium carbonate 20% solution. After reaction completion, the suspension is at a temperature of 15-25° c. and at a pH of 5.0-6.0.

(c) 58.0 g of 2-sulfoaniline are dissolved in water at a temperature of 20-25° C. and the pH of this solution is adjusted and maintained at 6.0-7.0 by addition of sodium hydroxide 30% solution.

2-Sulfoaniline solution is added over 5 min to the mixture obtained in step (b) and the mixture is heated to 60-70° C. While the pH is maintained at 5.0-5.5 by addition of sodium carbonate 20% solution, the mixture is stirred at 60-70° C. until reaction completion.

After reaction completion, the reaction mass is cooled to a temperature of 20-25° C. and unreacted 2-sulfoaniline is quenched with drops of acetic anhydride. The pH of said reaction mass is then set up at 5.5-6.0 with hydrochloric acid 32% solution and the reaction mass is heated up to 30-50° C., submitted to reverse osmosis process and dried leading to the crude reactive dye which main component, in the form of the free acid, corresponds to the formula:

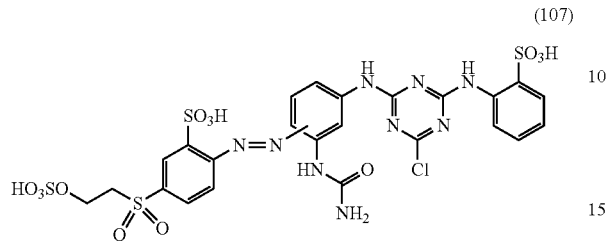

(107)

Comparative Examples 8 and 9

The following dyes can be prepared in a manner analogous to that described in Comparative Example 6.

Comparative Ex. 8

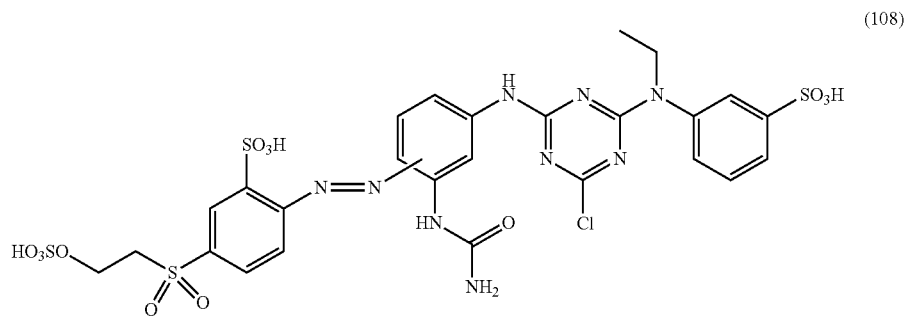

(108)

Comparative Ex. 9

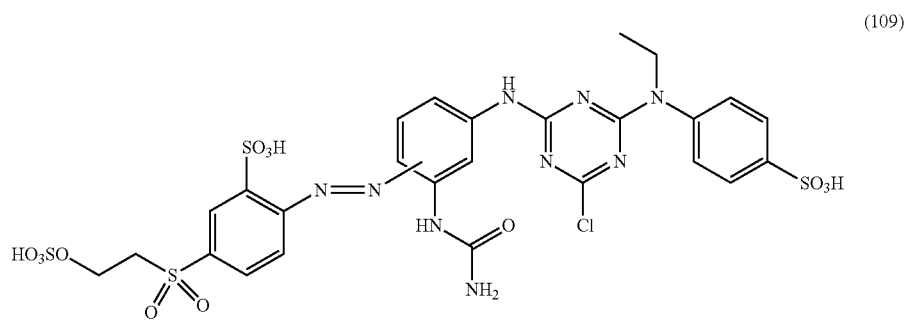

(109)

Application Examples 10a-10b-11a-11b and Comparative Application Examples 12-18

The Application examples 10a-10b-11a-11b and the comparative application examples 12-18 are prepared according to the following dyeing instructions:

Pad batch dyeing: On a padder having a squeezing effect of 75% (70%) liquor pick-up, a bleached (mercerized)cotton cretonne fabric is impregnated with an aqueous dyeing liquor containing, per litre, X g of the isomeric mixture according to the invention or the comparative dye, 1 g of a wetting agent (ALBAFLOW® PAD), 2 g of a dye bath softener (ALBATEX® DBS), 20 ml of sodium hydroxide 36° Bé and 70 ml of sodium silicate (water glass) 38°Bé. The immersion time is 2 seconds. After padding, the fabric is rolled up and then stored for 24 hours at a temperature of 25° C. After storage, the dyed cotton material is cold-rinsed with water (10 min), boiled in water (5 min) and subsequently cold-rinsed with water (10 min). Dyed fabrics are obtained dependent on the isomeric mixture of reactive dyes concentration (X g/l). Tables 1 and 2 summarize the isomeric mixture of reactive dyes concentration (X g/l), the maximum build-up property at the same E25 and the degree of fixation at the same reference depth for the application examples 10-11 and the comparative application examples 12-18.

The Application Example 10a is obtained with the isomeric mixture according to Example 1a (formula (101a)). The Application Example 10b is obtained with the isomeric mixture according to Example 1b (formula (101b)).

The Application Example 11a is obtained with the isomeric mixture according to Example 2a (formula (102a)). The Application Example 11b is obtained with the isomeric mixture according to Example 2b (formula (102b)).

The comparative applications examples 12-18 are obtained respectively with the dyes according to comparative examples 3-9.

The tinctorial strengths of the dyeings according to the application examples 10-11 and the comparative application examples 12-18 are given in units of RD (="Reference Depth"), a quantity obtained by an internal test method that specifies the colour depth and correlates with the standard depth SD according to ISO 105-A-1984 (E), page 4. The reference depths of the dyed fabric according to the application examples 10-11 and the comparative application examples 12-18 are measured photospectrometrically. The build-up diagrams are prepared, and the maximum build-up is determined in the usual manner.

Application Examples 19a-19b-20a-20b and Comparative Application Examples 21-27

The Application examples 19a-19b-20a-20b and the comparative application examples 21-27 are prepared according to the following pad batch dyeing instructions allowing to measure the bath stability property:

Dyeing Fabric T0: On a padder having a squeezing effect of 75% (70%) liquor pick-up, a bleached (mercerized)cotton cretonne fabric is impregnated with an aqueous dyeing liquor containing, per litre, X g of the isomeric mixture according to the invention or the comparative dye, 1 g of a wetting agent (ALBAFLOW® PAD), 2 g of a dye bath softener (ALBATEX® DBS), X ml of sodium hydroxide 36°Bé and 20 ml of soda ash. The immersion time is 2 seconds. After padding, the fabric is rolled up and then stored for 24 hours at a temperature of 25° C.

The aqueous dyeing liquor is put back in a thermostatic bath at 25° C. for 10 minutes allowing it not to cool down between 2 pad batch dyeings and also allowing to measure the bath stability of the isomeric dye mixture according to the invention in the dyeing temperature condition.

Dyeing Fabric T10: After 10 minutes, said aqueous dyeing liquor is put back in the padder above-described and a bleached (mercerized)cotton cretonne fabric is impregnated with said liquor. After padding, the fabric is rolled up and then stored for 24 hours at a temperature of 25° C.

TABLE 1

Measurements of maximum Build-up property for the application examples 10a-10b-11a-11b and the comparative application examples 12-18

| | App. Ex. 10a | App. Ex. 10b | App. Ex. 11a | App. Ex. 11b | Comp. App. Ex. 12 | Comp. App. Ex. 13 | Comp. App. Ex. 14 | Comp. App. Ex. 15 | Comp. App. Ex. 16 | Comp. App. Ex. 17 | Comp. App. Ex. 18 |
|---|---|---|---|---|---|---|---|---|---|---|---|
| $E_{25}$ (extinction at lmax/ c = 25 mg/l) | 0.43 | 0.43 | 0.43 | 0.43 | 0.43 | 0.43 | 0.43 | 0.43 | 0.43 | 0.43 | 0.43 |
| Maximum Build-up (Max. RD) | 2.24 | 2.22 | 2.05 | 2.16 | 2.09 | 2.29 | 2.13 | 2.03 | 1.89 | 2.09 | 2.13 |

The degree of fixation for the application examples 10a-10b-11a-11b and the comparative application examples 12-18 is determined in the usual manner by cutting a specimen of the dyed fabric of defined size and having a RD equivalent to 1 and dissolving/extracting the unfixed dyestuff with a phosphate buffered aqueous solution (pH 7) at the boil.

The aqueous dyeing liquor is put back in a thermostatic bath at 25° C. for 20 minutes.

Dyeing Fabric T20: After 20 minutes, said aqueous dyeing liquor is put back in the padder above-described and a bleached (mercerized)cotton cretonne fabric is impregnated with said liquor. After padding, the fabric is rolled up and then stored for 24 hours at a temperature of 25° C.

TABLE 2

Measurements of degree of fixation for the application examples 10-11 and the comparative application examples 12-18

| | App. Ex. 10a | App. Ex. 10b | App. Ex. 11a | App. Ex. 11b | Comp. App. Ex. 12 | Comp. App. Ex. 13 | Comp. App. Ex. 14 | Comp. App. Ex. 15 | Comp. App. Ex. 16 | Comp. App. Ex. 17 | Comp. App. Ex. 18 |
|---|---|---|---|---|---|---|---|---|---|---|---|
| Concentration dye (g/l) | 16.4 | 19.5 | 16.1 | 19.3 | 15.0 | 14.6 | 14.2 | 15.5 | 19.4 | 15.3 | 17.0 |
| Degree of fixation (%) at RD = 1 | 92 | 90 | 90 | 82 | 87 | 82 | 92 | 87 | 69 | 81 | 88 |

The aqueous dyeing liquor is put back in a thermostatic bath at 25° C. for 30 minutes.

Dyeing Fabric T30: After 30 minutes, said aqueous dyeing liquor is put back in the padder above-described and a bleached (mercerized)cotton cretonne fabric is impregnated with said liquor. After padding, the fabric is rolled up and then stored for 24 hours at a temperature of 25° C.

The different obtained dyed cotton fabrics T0, T10, T20 and T30 are stored in a thermostatic bath at 25° C. for 24 hours. Then, the dyed cotton fabrics T0, T10, T20 and T30 are cold-rinsed with water (10 min), boiled in water (5 min) and subsequently cold-rinsed with water (10 min), spun and ironed.

The resulting dyed fabrics T0, T10, T20 and T30 are stored in the dark overnight and then, their tinctorial strength is measured colorimetrically using a spectrocolorimeter Datacolor 600.

For the dyed fabric T0, the tinctorial strength measurement named "immediate strength measurement". For all the dyed fabric T0, the concentration of the dye (g/l) is set up to achieve a RD equivalent of 0.5 and this RD value is set up as a reference defined as 100%.

For the dyed fabrics T10, T20 and T30, their tinctorial strengths are respectively measured and compared to the immediate strength measurement.

The determination of the bath stability property of the isomeric mixture of reactive dye according to the invention and also the comparative dyes is the time corresponding to achieve a loss of tinctorial strength above 5% compared to the immediate strength measurement.

Table 3 summarizes the isomeric mixture of reactive dyes concentration (X g/l) and the bath stability.

The Application Example 19a is obtained with the isomeric mixture according to Example 1a (formula (101a)). The Application Example 19b is obtained with the isomeric mixture according to Example 1b (formula (101b)).

The Application Example 20a is obtained with the isomeric mixture according to Example 2a (formula (102a)). The Application Example 20b is obtained with the isomeric mixture according to Example 2b (formula (102b)).

The comparative applications examples 21-27 are obtained respectively with the dyes according to comparative examples 3-9.

dye bath show an improved bath stability, especially the isomeric mixture (101a or 101b) and (102a or 102b) according to the invention loss more than 5% of tinctorial strength after 30 min compared to comparative dyes which are reaching the 5% loss of tinctorial strength after 20 minutes at most.

Further, the results in Table 3 show a synergy regarding the bath stability of the isomeric mixture (101a or 101b) when compared individually to each of the isomers (104) and (105) composing the isomeric mixture according to the invention.

Therefore, the isomeric mixture according to the invention show very good build-up properties and very high degree of fixation and at the same time show superior bath stability compared to their isomers taken alone or compared to prior art dyes.

The invention claimed is:

1. An isomeric mixture of at least one reactive dye of formula (I):

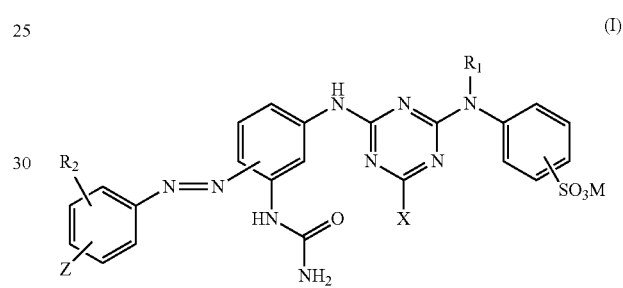

wherein, $R_1$ is hydrogen or $C_1$-$C_4$ alkyl, $R_2$ is hydrogen, $C_1$-$C_4$ alkyl, $C_1$-$C_4$ alkoxy, sulfo, carboxy or halogen, Z is a fibre-reactive radical of formula —$SO_2$—CH=$CH_2$, —$SO_2$—$(CH_2)_2$—Y, —NH—$(CH_2)_2$—

TABLE 3

Measurements of the bath stability for the application examples 19-20 and the comparative application examples 12-18

| | App. Ex. 19a | App. Ex. 19b | App. Ex. 20a | App. Ex. 20b | Comp. App. Ex. 21 | Comp. App. Ex. 22 | Comp. App. Ex. 23 | Comp. App. Ex. 24 | Comp. App. Ex. 25 | Comp. App. Ex. 26 | Comp. App. Ex. 27 |
|---|---|---|---|---|---|---|---|---|---|---|---|
| Concentration dye (g/l) | 7.9 | 8.1 | 7.8 | 8.0 | 6.6 | 7.2 | 6.9 | 7.5 | 8.5 | 7.0 | 7.7 |
| Bath Stability (min) | 30 | 30 | 30 | 30 | <10 | 20 | <10 | 20 | <10 | 10 | 10 |

The results summarized in Tables 1, 2 and 3 demonstrate the superiority of the isomeric mixture (101a or 101b) and (102a or 102b) according to the invention compared to the comparative dyes.

Especially, the textiles dyed respectively with the isomeric mixture (101a or 101b) and (102a or 102b) according to the invention present at the same time a very good build-up property, i.e. the maximum RD value is higher than 2.00, a very good degree of fixation, i.e. the degree of fixation is higher or equal to 90%, as well as the isomeric mixture (101a or 101b)-(102a or 102b) when present in the O—$(CH_2)_2$—$SO_2$—CH=$CH_2$, —NH—$(CH_2)_2$—O—$(CH_2)_2$—$SO_2$—$(CH_2)_2$—Y, —NH—$(CH_2)_2$—O—$(CH_2)_3$—$SO_2$—CH—$CH_2$, —NH—$(CH_2)_2$—O—$(CH_2)_3$—$SO_2$—$(CH_2)_2$—Y, —NHCO—$(CH_2)_3$—$SO_2$—CH—$CH_2$ or —NHCO—$(CH_2)_3$—$SO_2$—$(CH_2)_2$—Y wherein Y is a group removable under alkaline conditions, X is halogen, and M is hydrogen, an organic salt, an alkali metal or one equivalent of an alkaline earth metal.

2. The isomeric mixture according to claim 1 comprising at least an isomer of formula (Ia):

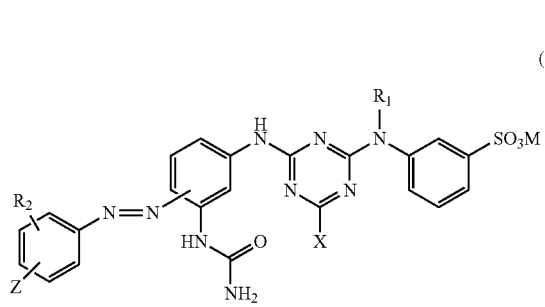
(Ia)

and an isomer of formula (Ib):

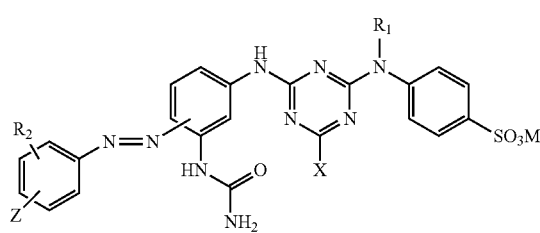
(Ib)

wherein, $R_1$, $R_2$, Z, X and M are defined in claim 1.

3. The isomeric mixture according to claim 2 wherein said mixture comprises the isomer of formula (Ia) and the isomer of formula (Ib) in a weight ratio ranging from 1:4 to 4:1.

4. The isomeric mixture according to claim 2 wherein said mixture comprises the isomer of formula (Ia) and the isomer of formula (Ib) in a weight ratio ranging from 1:4 to 1:1.

5. The isomeric mixture according to claim 2 wherein said mixture comprises the isomer of formula (Ia) and the isomer of formula (Ib) in a weight ratio ranging from 4:1 to 1:1.

6. The isomeric mixture according to claim 2 wherein said mixture comprises:

at least an isomer of formula (Ia) comprising the reactive dyes of formula (Ia1) and (Ia2):

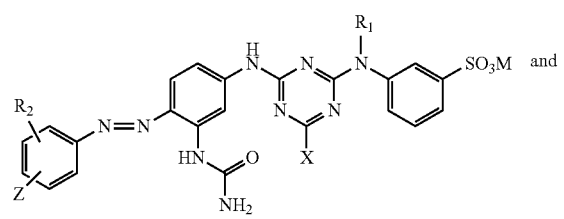
(Ia1) and

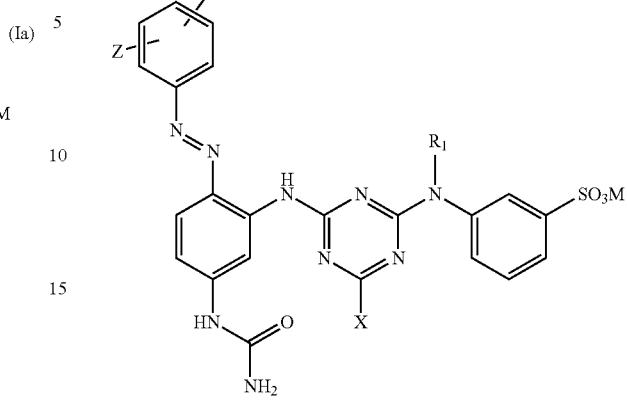
(Ia2)

and, at least an isomer of formula (Ib) comprising a mixture of isomers of formula (Ib1) and (Ib2):

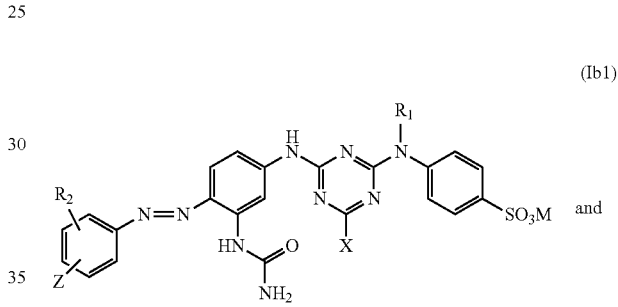
(Ib1) and

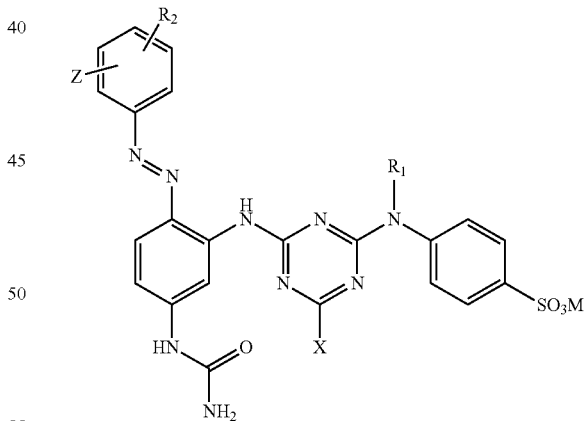
(Ib2)

wherein, $R_1$, $R_2$, Z, X and M are defined in claim 1.

7. The isomeric mixture according to claim 6 wherein the weight ratio of the reactive dyes (Ia1) and (Ib1) to the reactive dyes (Ia2) and (Ib2) is ranging from 6:4 to 99:1.

8. The isomeric mixture according to claim 1 wherein $R_1$ is hydrogen, methyl, ethyl, n-propyl or n-butyl.

9. The isomeric mixture according to claim 1 wherein $R_2$ is hydrogen, methyl, ethyl, sulfo, carboxy or halogen.

10. A process for the preparation of an isomer mixture according to claim 1 which comprises:

(a) diazotising a compound of the formula

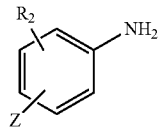
(1)

wherein $R_2$ and Z are defined according to claim 1;

and reacting the diazonium salt so obtained with a coupling component of formula

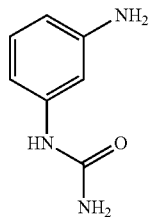
(2)

whereby an azo compound of formula

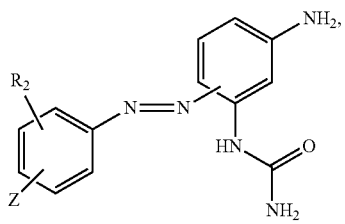
(3)

is obtained, wherein $R_2$ and Z are defined according to claim 1;

(b) condensing the azo compound of formula (3) prepared in step (a) with a compound of formula

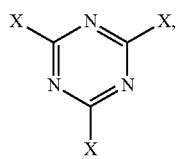
(4)

wherein X represent the same halogen and are defined according to claim 1, thereby providing a compound of formula

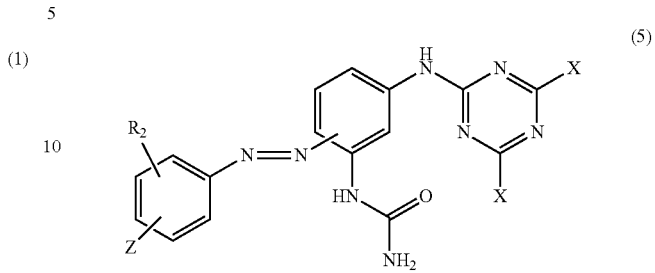
(5)

wherein $R_2$, Z and X are defined according to claim 1;

(c) condensing the compound of the formula (5) prepared in step (b) with the isomeric mixture of compound of formula

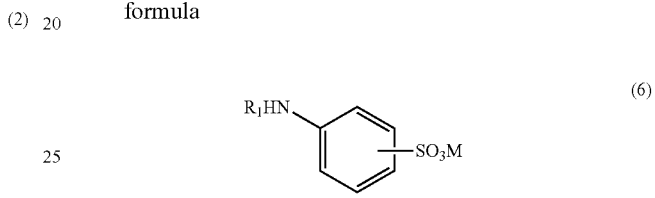
(6)

wherein $R_1$ and M are defined according to claim 1, thus providing the isomeric mixture of reactive dye of formula (I) according to claim 1.

11. The process according to claim 10 wherein the isomeric mixture of compound of formula (6) comprises two isomers being one isomer with the sulfo group on meta position of the aniline and the other isomer with the sulfo group on para position of the aniline.

12. An aqueous inks comprising the isomeric mixture of at least one reactive dye of formula (I) according to claim 1.

13. A textile dyed or printed with the isomeric mixture of at least one reactive dye of formula (I) according to claim 1.

14. A process for dyeing or printing of hydroxy-group-containing or nitrogen-containing fibre materials, which process comprises applying the isomeric mixture of at least one reactive dye of formula (I) according to claim 1 to a hydroxy-group-containing or nitrogen-containing fibre material.

15. A process comprising printing the aqueous ink of claim 12 onto a textile, paper or plastic film using an ink jet printer.

16. The isomeric mixture according to claim 2 wherein said mixture comprises the isomer of formula (Ia) and the isomer of formula (Ib) in a weight ratio ranging from 3:7 to 2:3.

17. The isomeric mixture according to claim 2 wherein said mixture comprises the isomer of formula (Ia) and the isomer of formula (Ib) in a weight ratio ranging from 7:3 to 3:2.

18. The isomeric mixture according to claim 6 wherein the weight ratio of the reactive dyes (Ia1) and (Ib1) to the reactive dyes (Ia2) and (Ib2) is ranging from 8:2 to 95:5.

* * * * *